April 23, 1946.  H. F. FARRANCE  2,399,012
MEASURING DEVICE
Filed Feb. 15, 1944

INVENTOR
H.F. FARRANCE
BY E.R. Nowlan
ATTORNEY

Patented Apr. 23, 1946

2,399,012

UNITED STATES PATENT OFFICE 2,399,012

MEASURING DEVICE

Harry F. Farrance, Jersey City, N. J., assignor to Western Electric Company, Incorporated, New York, N. Y., a corporation of New York Application February 15, 1944, Serial No. 522,447

4 Claims. (Cl. 33—178)

This invention relates to measuring devices, and more particularly to devices for measuring internal diameters of hollow articles.

An object of the invention is to provide a measuring device which is simple in structure, readily actuable and highly efficient in measuring internal diameters of hollow structures.

With this and other objects in view, the invention comprises a tapered element receivable in an aperture, of a structure, to be measured a given distance depending upon the diameter of the aperture, an indicating unit, and means actuable by movement of the element into the aperture to actuate the unit to cause the latter to register the size of the aperture.

Figure 1:
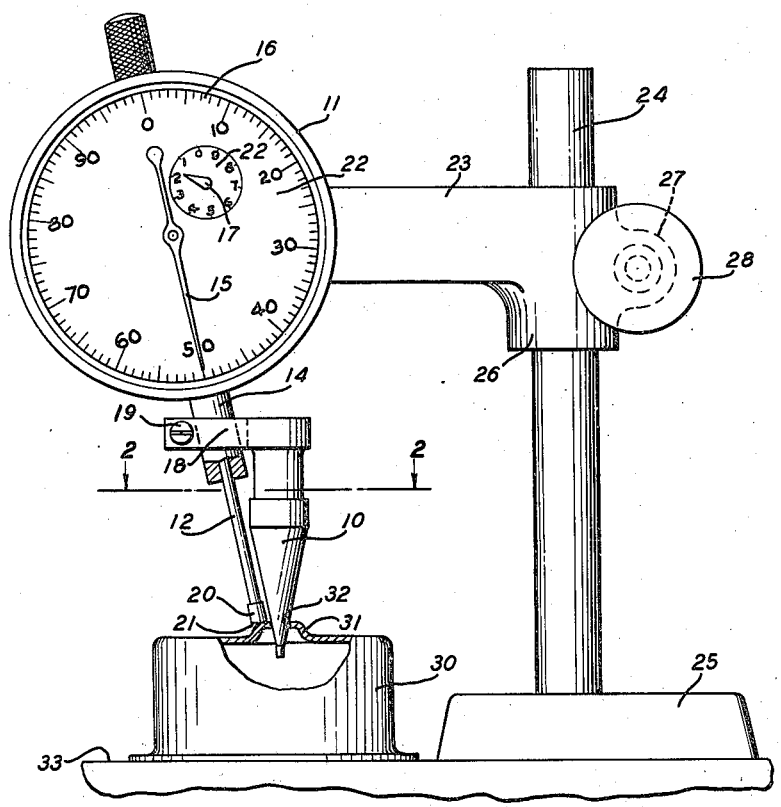
Figure 2:
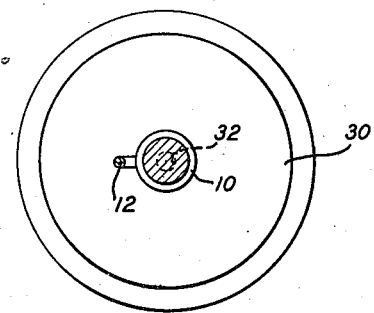

Other objects and advantages will be apparent from the following detailed description when considered in conjunction with the accompanying drawing, wherein Fig. 1 is a front elevational view of the device measuring an aperture in an article, portions of the device and article being broken away, and Fig. 2 is a lateral sectional view taken along the line 2—2 of Fig. 1.

The measuring device includes a tapered or conical element 10, of the contour shown, formed of suitable material, such as tool steel, so as to resist wear. The conical or tapered portion of the element 10 is formed so that every cross-sectional area thereof is of a known diameter. A unit 11, of a commercially known type, for example, such as those illustrated in Federal Precision Measuring Instruments, Catalogue No. 40, issued by Federal Products Corporation, 1144 Eddy Street, Providence, Rhode Island, is made a part of the measuring device. As the unit 11 is commercially known, it is not believed necessary to illustrate in detail the internal mechanism thereof.

In the present instance the mechanism is under the control of a plunger 12 slidably disposed in a sleeve 14. Through the actuation of the mechanism by the plunger, a hand 15 is rotated relative to a dial 16 to indicate fractions of an inch, for example, thousandths of an inch. A smaller hand 17 is also actuated by the mechanism, this hand being moved one indication of its dial member 22 for each revolution of the hand 15, or one complete revolution during ten revolutions of the hand 15.

The element 10 is formed with an integral mounting portion 18, apertured at an angle with respect to the center line of the element to receive the sleeve 14 and to be clamped thereon through the aid of a screw 19. The lower portion of the plunger 12 is enlarged, as at 20, and provided with an engaging surface 21 to rest upon the work or article adjacent the aperture of which is to be measured. It will also be noted that the center line of the plunger 12, although at an angle with respect to the center line of the element, is parallel with the adjacent tapered surface thereof.

The structure thus far described may be supported in any desired manner depending upon the articles to be gaged. In the present illustration, a supporting bracket 23, fixed to the unit 11 in any suitable manner (not shown), is formed for mounting upon an upright 24 carried by a base 25. A vertically apertured portion 26 of the bracket 23 receives the upright 24 and is split vertically at one side thereof, where adjacent integral flanges 27 thereof may be drawn toward each other by a clamping screw 28 to clamp the bracket at any desired position on the upright 24. Normally, with the clamping screw loosened, the bracket 23 is free to move on the upright 24.

In the present illustration an article 30, having an offset portion 31 adjacent its center, is provided with an aperture 32, the diameter of which is to be measured. The plunger 12 is normally urged downwardly and is disposed adjacent the lower end of the element 10. By placing the article upon a table 33, the surface of which is at right angles to the center line of the upright 24 and therefore at right angles to the center line of the element 10, the element may be lowered into the aperture by loosening the clamping screw 28 and allowing the device supported by the bracket 23 to move freely downwardly until the element 10 comes to rest within the aperture 32. During this downward movement of the element 10, the surface 21 of the plunger 12 rests upon the article adjacent the aperture. Thus, the relative movement of the element 10 and the unit 11 with respect to the plunger 12 will cause the hands 15 and 17 to be moved relative to their dial members 16 and 22 to register, accurately, the size or diameter of the aperture 32 the moment the element 10 comes to rest therein.

The device has been shown with a stationary support for the article and the aperture being measured by movement of the element 10 and unit 11 to lower the element into the aperture. The same result may be accomplished by holding the element and unit against movement, and by moving the article relative thereto.

With this device apertures of various diameters may be readily and accurately measured through the aid of the tapered element, there existing a relative movement of the element and plunger a distance depending upon the diameter of the aperture. Also, internal dimensions of hollow articles such as tubes, pipes and the like may be readily and accurately measured.

Although specific improvements of the invention have been shown and described, it will be understood that they are but illustrative and that various modifications may be made therein without departing from the scope and spirit of this invention as defined by the appended claims.

What is claimed is:

1. A device for measuring apertures in articles comprising an actuable indicating unit, a tapered element singly receivable, in apertures of articles, variable distances with variations in the sizes of the apertures being measured, means to fixedly secure the element to the unit, and a member positioned to singly engage the articles adjacent the element and movable relative thereto varied distances, depending upon the sizes of the said apertures, to actuate the unit and cause it to singly indicate the sizes of the apertures.

2. A device for measuring apertures in articles comprising an actuable indicating unit, a tapered element singly receivable, in apertures of articles, variable distances with variations in the sizes of the apertures being measured, means to fixedly secure the element to the unit, a member positioned to singly engage the articles adjacent the element and movable relative thereto varied distances, depending upon the sizes of the said apertures, to actuate the unit and cause it to singly indicate the sizes of the apertures, and separate means, for respectively supporting the unit, with the element and member, and the articles, movable relative to each other.

3. A device for measuring apertures in articles comprising a unit including an indicating dial and a pointer movable relative to the dial to successively indicate the sizes of apertures, a tapered element singly receivable, in apertures of articles, variable distances with variations in the sizes of the apertures being measured, means to fixedly secure the element to the unit, and a member positioned to singly engage the articles and movable relative to the element varied distances, depending upon the sizes of the said apertures to move the pointer relative to the dial to successively indicate the sizes of the apertures.

4. A device for measuring apertures in articles comprising an actuable unit to indicate the sizes of apertures in articles, a conical element singly receivable varied distances in apertures of various sizes, means to fixedly secure the element to the unit, and a member, having one end operatively connected to the unit to actuate the unit upon longitudinal movement of the member, and the other end disposed to engage the articles singly adjacent their apertures, whereby relative movement of one of the articles and the element until the element is seated in the aperture thereof will cause relative movement of the element and member a given distance depending upon the size of the said aperture.

HARRY F. FARRANCE.